United States Patent Office 3,759,899
Patented Sept. 18, 1973

3,759,899
PROCESS FOR INTRODUCING A DELTA 5,6-DOUBLE BOND INTO A STEROID
Percy L. Julian and Arnold Hirsch, Oak Park, Ill., and Ernst Iseli, Basel, Switzerland, assignors to Ciba-Geigy Corporation, Ardsley, N.Y.
No Drawing. Continuation of application Ser. No. 47,907, June 19, 1970. This application Jan. 20, 1972, Ser. No. 219,545
Int. Cl. C07c *173/00*
U.S. Cl. 260—239.55
34 Claims

ABSTRACT OF THE DISCLOSURE

The present invention provides a process for introducing an olefinic double bond into the 5,6-position of a steroid by reducing a 5,6-oxido group. Since in general the 5,6-oxido group is formed from a 5,6-unsaturated compound by treatment with an organic peracid, a process for the elimination of such an oxido group with formation of a 5,6-double bond is of special value when a 5,6-oxido group can be used as protective group or for reactions with peracids in other positions of the molecule in which a 5,6-oxido group is formed but is not desired.

CROSS-REFERENCE TO RELATED APPLICATIONS

This application is a continuation of Ser. No. 47,907, filed June 19, 1970, which in turn is a continuation-in-part of application Ser. No. 818,392, filed Apr. 22, 1969, both now abandoned.

BACKGROUND OF THE INVENTION

The temporary protection of a 5,6-double bond is a step frequently employed in a steroid chemistry when reactions on other positions of the steroid molecule are to be carried out, in which the 5,6-double bond would not remain intact as for instance and especially when introducing a 17α-hydroxy group in a $\Delta^5$-3-hydroxy-20-oxo-pregnene or an ester thereof or when forming the dihydroxyacetone side-chain from the said compounds, or when the $\Delta^5$-3-hydroxy group is being converted into the $\Delta^4$-3-oxo group. In the past such protection was mainly achieved by one of the following methods:

(a) Addition of bromine onto the 5,6-double bond with formation of the 5,6-dibromo compound (cf. U.S.A. specification 3,187,025).

(b) Addition of chlorine onto the 5,6-double bond with formation of the 5,6-dichloro compound (cf. U.S.A. specification 3,030,389).

(c) Conversion of the $\Delta^5$-3-hydroxyl group into a 3,5-cyclo-6-alkoxy-steroid (cf. U.S.A. specification 3,231,-568).

From these protective groups the 5,6-double bond in (a) and (b) can be regenerated by reduction with metals, for example zinc and acetic acid, or with sodium iodide in acetone and, in the case of (c), by treatment with an acid. These methods have been used especially in the manufacture of pharmacologically important corticoids such as cortisone, hydrocortisone, prednisolone, prednisone, 16α-methyl-prednisone and 16α-methyl prednisolone, triamcinolone and its 16,17-aldehyde- or ketoneacetals, and dexamethasone.

The above-mentioned introduction of a 17α-hydroxyl group is advantageously performed by peracid-oxidation of $\Delta^{17,20}$-enolesters of 20-oxo-pregnane compounds via the 17,20-oxido derivatives. When the starting product contains a 5,6-double bond, as is the case for instance when pregnenolone is used in the synthesis of 17α-hydroxy-pregnenolone or of Reichstein's substance S, it had been necessary in the past to provide temporary protection for the 5,6-double bond, for example by one of the above-mentioned methods, since in the said peracid treatment this bond is likewise oxidized with formation of the 5,6-oxido group and this group is retained in the following steps no method having been known in the past for eliminating it with regeneration of the 5,6-double bond.

If a good method could be found to reconvert the 5,6-oxido group reductively into the 5,6-double bond, a protection for the 5,6-double bond would no longer be needed and there would be a good process available for the manufacture of 17α-hydroxy-pregnenolone and its acetate. (See scheme of reactions on page 7.) Moreover, in the manufacture of Reichstein's substance S the 5,6-oxido group may serve as a protective group during the last stage of the synthesis of the dihydroxyacetone side-chain, that is to say in the introduction of the 21-hydroxyl or acyloxy group. (See pages 6 and 7.) This would constitute a double improved process for the manufacture of 17-hydroxy-21-acetoxypregnenolone which, as is known, can be converted in good yields microbiologically, for example with Flavobacterium dehydrogenans into Reichstein's substance S.

SUMMARY OF THE INVENTION

According to the observation on which the present invention is based a 5,6-oxido group formed by reaction of a 5,6-double bond with a peracid can be reconverted reductively and in good yields to the 5,6-double bond. Since the crude mixture of the α,α- and β,β-oxides formed in a very good yield in the treatment of the 5,6-unsaturated compounds with an organic peracid, in which mixture the α,α-isomers generally predominate, can be used as it is for the reduction according to this invention, the present process for the temporary protection of a 5,6-double bond or for the manufacture of the pharmacologically important steroids mentioned above is a considerable advance. The conversion of the 5,6-oxido group into the 5,6-double bond occurs according to the present invention with particularly good yields also with the pure 5α,6α-oxido-steroids.

SPECIFIC EMBODIMENTS OF THE INVENTION

The present process for the introduction of an olefinic double bond into the 5,6-position of a steroid is characterized in that a corresponding 5α,6α-oxido steroid or a mixture of a 5α,6α- and a 5β,6β-oxido steroid is treated with an excess over 2 mol equivalents of hydrogen iodide and, if desired, with an agent capable of reducing iodine to hydrogen iodide or a salt thereof.

The reaction according to this invention is preferably conducted with hydrogen iodide in a concentrated aqueous solution, for example of 55% strength approximately, and a large excess of acid, advantageously about 6 to 8 mol equivalents, is used. Reduction of the epoxide group however takes place also with less hydrogen iodide and even with a ratio below 2 mol equivalents, but not below 1, the yields then being of course unsatisfactory. The reduction is advantageously carried out under mild conditions, for example at room temperature. The reaction is in general complete after about half an hour to an hour. As solvents for the steroid compound there may be used hydrocarbons, especially chlorinated hydrocarbons such as methylenechloride, ethylenechloride, chlorobenzene, chlorotoluene or ethers such as dioxane and more especially tetrahydrofuran.

Since during the reaction according to this invention iodine is liberated, it is of advantage to reduce it after the treatment with hydriodic acid in the reaction mixture to hydriodic acid or a salt thereof, and this can be achieved in known manner by treatment with any agent capable of reducing iodine to hydriodic acid. A particularly suitable way for the reductive elimination of iodine is the addition of sodium bisulphite, for example in form of a 20% aqueous solution. Alternatively, other reducing agents, such as sodium thiosulphate or sodium hyposulfite, may be added.

The starting material for the process of the present invention may be any desired 5α,6α-oxide steroid or a mixture of these with the 5β,6β epimers. They may belong, for example, to the androstane, pregnane, cholestane, stigmastane or cardanolide series and contain further substituents such as alkyl, especially methyl, groups, halogen atoms, further oxido groups, free or functionally modified hydroxyl, amino or oxo groups. Preferred use is made of 5,6-oxido-steroids of the pregnane series as are formed during the synthesis of the above-mentioned known corticoids, especially compounds of the formula

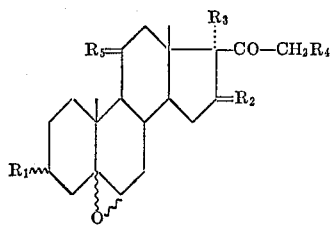

in which $R_1$ represents a free, esterified or etherified α- or β-hydroxyl group, $R_2$ represents 2 hydrogen atoms or a hydrogen atom together with an α- or β-alkyl group, especially with a methyl group, or a free, esterified or etherified α-hydroxyl group; furthermore an alkylene, especially a methylene group; $R_3$ and $R_4$ each represents a hydrogen atom or a free, esterified or etherified hydroxyl group, and $R_5$ represents 2 hydrogen atoms or a hydroxyl group together with hydrogen or an oxo group, and $R_3+R_2$ may also represent the residue

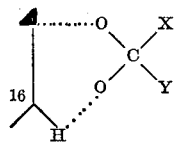

in which X and Y represent 2 hydrocarbon residues which may be unsubstituted or substituted, for example, by hydroxyl groups or acyloxy groups or free or esterified carboxyl groups. By using the representation

it is intended to state that it is possible to use the pure α,α-epimers, or mixtures thereof with the β,β-epimers, for example those generally formed in the manufacture from $\Delta^{5,6}$-steroids with the use of a peracid. The said esterified hydroxyl groups are in the first place those esterified with a lower aliphatic carboxylic acid, for example acetic or propionic acid. Etherified hydroxyl groups are especially those etherified with lower aliphatic alcohols, for example methanol or ethanol, or with benzyl alcohol or tetrahydropyranol.

As mentioned above, the present process is particularly suitable for introducing a 17α-hydroxyl group into a pregnenolone derivative and for introducing a 21-hydroxyl or acyloxy group. The application of the process to these syntheses can be illustrated by the following scheme of reactions:

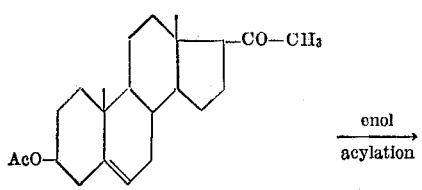

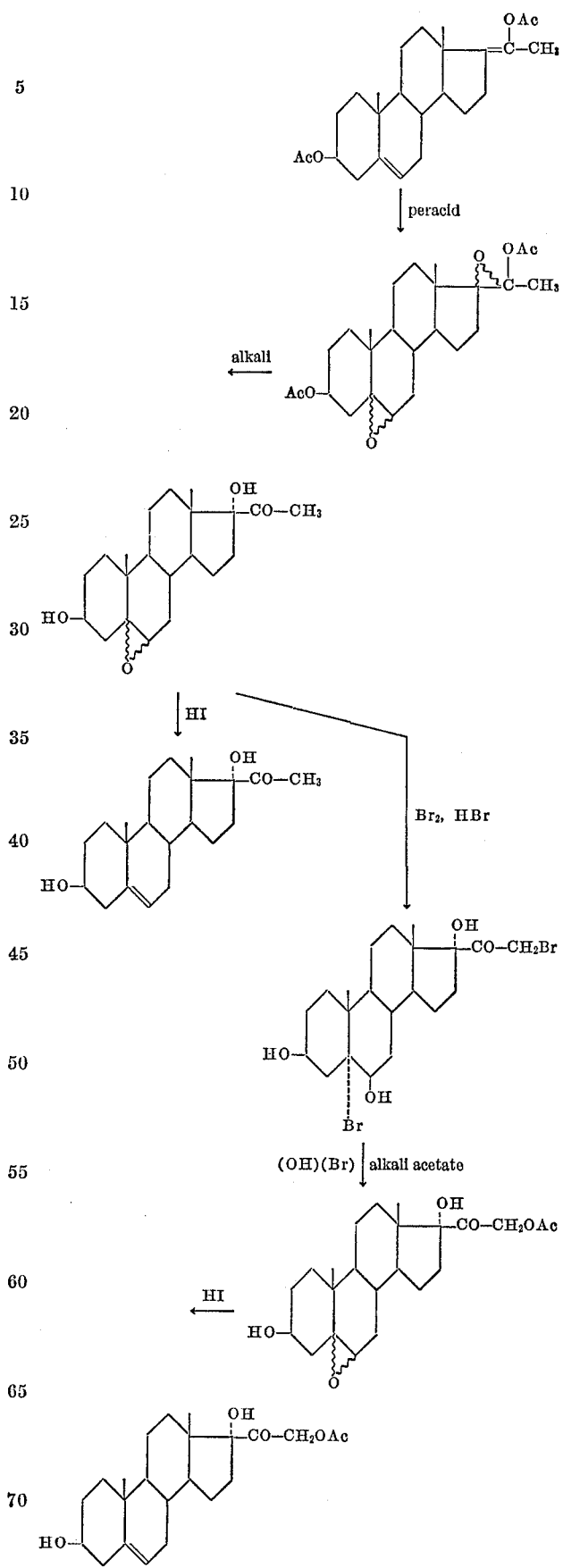

The identical reactions can also be carried out with the 11-oxygenated compounds and/or the 16α- or 16β- methyl derivatives. The Δ⁵-3,17α,21-trihydroxy-20-oxo-pregnene-21-acylates obtained in this manner can be oxidized in known manner to the corresponding Δ⁴-3-ketones, for example according to U.S.A. specification 3,030,278 microbiologically or by means of chromium trioxide+sulphuric acid in acetone (Jones' reagent), for example according to U.S.A. specification 3,187,025 or by the said U.S. specification 3,231,568, Example 4.

The 5,6-oxido group can also be useful in the manufacture of 16α-hydroxy-corticosteroids of the triamcinolone type as protective group, as shown by the following scheme of reactions:

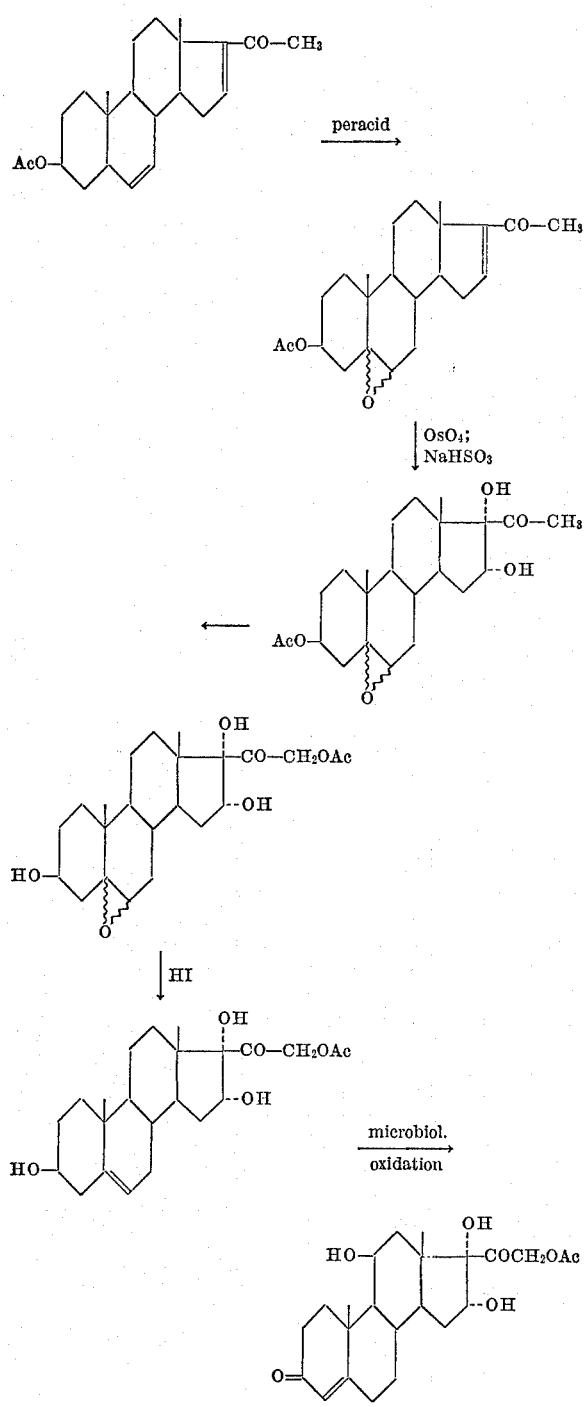

The starting materials are known or, insofar as they are new, they can be prepared by known methods. The most frequently used process for the manufacture of the starting materials for the performance of the present process and which is of course of primary importance for the in-termediate protection of a 5,6-double bond, or for the synthesis of, for example, Δ⁵-17α-hydroxy-pregnene compounds, is the reaction of the corresponding 5,6-unsaturated compounds with an organic peracid, for example with perbenzoic, chloroperbenzoic peracetic or perphthalic acid. This reaction furnishes as a rule mixtures of the two epimeric epoxides, that is of the 5α,6α-epoxide, which will be designated in ths applicaton by the notaton 5ξ,6ξ. From this mixture the pure epimers can be obtained in known manner. The starting material to be used in the present process may be the said mixture of the α,α-pure epimer.

The invention includes more especially also a process for the selective protection of the 5,6-double bond of a 5,6-unsaturated steroid, which is characterized in that this steroid is converted into a 5ξ,6ξ-oxido steroid, then on other positions of the steroid the desired reaction or sequence of reactions is carried out in which the 5,6-oxido group remains intact or is reformed at the end, and the 5,6-double bond is regenerated by treatment with an excess over 2 mol equivalents of hydiodic acid and, if desired, with a reducing agent capable of reducing iodine to hydriodic acid. This process is particularly needed for the intermediate protection of the 5,6-double bond in the above-mentioned syntheses, for example when introducing a 21-acyloxy group into a 21-unsubstituted Δ⁵-20-oxopregnene compound and when introducing a 16α-hydroxyl group into a Δ⁵,¹⁶-steroid of the pregnane series.

Furthermore, the invention is specially concerned with a process for introducing a 17α-hydroxyl group into a Δ⁵-20-oxopregnene compound, according to which the Δ¹⁷,²⁰-enolacylate is manufactured and then treated with an organic peracid, in the resulting 5ξ,6ξ; 17,20-bis-oxido compound the 17,20-oxido group is converted into a 17α-hydroxy-20-oxo group and the 5,6-double bond, if desired after having performed further reactions in which the 5,6-oxido group remains intact or is reformed at the end, is regenerated by treatment with an excess over 2 mol equivalents of hydrogen iodide and, if desired, with a reducing agent capable of reducing iodine to hydriodic acid.

The invention includes also any variant of the present processes in which an intermediate obtained at any stage of the process is used as starting material and any remaining step(s) is/are carried out or the process is discontinued at any stage thereof, or in which a starting material is formed under the reaction conditions.

The following examples illustrate the invention.

EXAMPLE 1

17 ml. of a 57% aqueous solution of hydriodic acid are introduced in a continuous jet at 25° C. into a well stirred suspension of 8.5 g. of 3β,17α-dihydroxy-5,6ξ-oxido-20-oxopregnane in 40 ml. of tetrahydrofuran. A solution forms which soon turns dark red. On completion of the injection the batch is stirred for half an hour, during which at first a substance settles out which then forms a fine suspension. Then 85 ml. of 20% sodium bisulphite are added slowly, during which the iodine colour disappears and the product precipitates. The mixture is then diluted with ½ litre of water. The colourless product is thoroughly washed with water, potassium bicarbonate solution and again with water and dried, to yield 7.4 g. of the crude Δ⁵-3β,17α-dihydroxy-20-oxopregnene. By suspending it in 20 ml. of methanol it yields 7 g. (=86.5%) of pure Δ⁵-3β,17α-dihydroxy-20-oxopregnene melting at 260-262° C.

EXAMPLE 2

6 grams of the 21-acetate of 3β,17α,21-trihydroxy-5ξ,6ξ-oxido-20-oxopregnane are added to 60 ml. of methylene-chloride and to the whole there are added 12 ml. of 57% aqueous hydriodic acid, during which the colourless material slowly dissolves and the solution turns dark red. The mixture is stirred on for 15 minutes and then mixed with 60 ml. of 20% sodium bisulphite solution, whereupon the solution loses its colour. The methylenechloride phase is separated and evaporated under vacuum, to leave an amorphous residue which is digested with ½ litre of water. The whole is filtered and the filter residue rinsed with water and dried. It constitutes crude 21-acetate of $\Delta^5$-$3\beta,17\alpha,21$-trihydroxy-20-oxopregnene melting at 190–195° C. The pure compound obtained by recrystallization from acetone melts at 208.5–211° C.

The starting material can be prepared thus:

A solution of 7.8 g. of the 3-acetate of $3\beta,17\alpha$-dihydroxy-$5,6\xi$-oxido-20-oxopregnane in 39 ml. of methylenechloride is mixed with 5.33 g. of 30% hydrobromic acid in glacial acetic acid. The mixture is stirred for 5 minutes, whereupon a handsomely crystalline, colourless bromohydrin settles out. Then 39 ml. of methylenechloride and 8 ml. of methanol are added, whereupon all passes into solution, and an aliquot proportion of a solution of 3.2 g. of bromine in 8 ml. of methylenechloride is added. To trigger the reaction hydrogen chloride gas is injected into the solution. The remainder of the bromine solution is added at the same rate as bromine is consumed. The pale yellow solution is washed with 100 ml. of water and the solution is then evaporated to dryness under vacuum. The colourless residue is added to 16 ml. of methanol and the whole is mixed with 16 ml. of 10% methanolic hydrochloric acid. The mixture is then stirred for 24 hours at 25° C. Then 150 ml. of water are dropped in, the solid colourless product is suctioned off, washed with water and dried in a current of air; it melts at 145–150° C. and constitutes the 21-bromo-5,6-bromohydrin of the said starting material. It is dissolved in 80 ml. of acetone and mixed with 16 g. of potassium acetate. The mixture is refluxed for 24 hours, then cooled and evaporated under vacuum, and a viscous magma is left which is diluted with 250 ml. of water and the colourless product which settles out is suctioned off, washed with water and dried, it constitutes the 21-acetate of $3\beta,17\alpha,21$-trihydroxy-5,6-oxido-20-oxopregnane.

The $3\beta,17\alpha$-dihydroxy-5,6-oxido-20-oxopregnane-acetate is obtained from the corresponding $\Delta^5$-compound by treatment with m-chloroperbenzoic acid in known manner.

EXAMPLE 3

20 ml. of a 57% aqueous solution of hydriodic acid are added to a well stirred suspension of 10 g. of $3\beta,17\alpha$-dihydroxy-$5,6\xi$-oxido-16$\alpha$-methyl - 20 - oxopregnane in 40 ml. of tetrahydrofuran at 25° C. The solution formed turns dark red. It is stirred on for half an hour, during which at first a substance settles out which later on forms a fine suspension. Then a solution of 20 g. of sodium bisulphite in 100 ml. of water is dropped in, during which the colour of iodine disappears and a solid substance settles out. The mixture is then diluted with 400 ml. of water and suctioned. The product is thoroughly washed with water and then dried, to yield 9.3 g. (=97.5%) of $\Delta^5,3\beta,17\alpha$-dihydroxy-16$\alpha$-methyl - 20 - oxopregnene melting at 226–236° C. $[\alpha]_D = -71.9°$ (in pyridine).

EXAMPLE 4

108.6 grams of $3\beta,17\alpha$-dihydroxy-$5,6\xi$-oxido-16$\alpha$-methyl-20-oxopregnane are placed in 1 litre of methylenechloride, 80 g. of a 30% solution of hydrogen bromide in glacial acetic acid are added. A pale greenish solution forms from which a colourless substance slowly settles out. The mixture is stirred for 5 minutes at 27° C., then 100 ml. of methanol and a small quantity of a solution of 47.4 g. of bromine in 100 ml. of methylenechloride are added, whereupon the mixture turns red. Then hydrogen chloride gas is injected until the red colour disappears. The injection of gas is then discontinued and the remainder of the bromine solution is added at the same rate as bromine is being consumed. The solid substance slowly dissolves and forms a faintly orange solution when all bromine has been added. The mixture is stirred for 5 minutes and then evaporated under vacuum below 30° C. The residue is taken up in 200 ml. of acetone and again evaporated. The resulting residue is suspended in 1560 ml. of acetone and 300 g. of potassium acetate are added. The mixture is then refluxed for 20 hours. The mixture is concentrated under vacuum to a volume of 300 ml. and 5 litres of water are added. The precipitate formed is suctioned off, thoroughly washed with water and dried, to yield 120 g. of a faintly yellowish product, being the 21-acetate of $3\beta,17\alpha,21$-trihydroxy-$5,6\xi$-oxido-16$\alpha$-methyl-20-oxopregnane. The yield amounts of 95.5% of the theoretical.

A solution of 120 g. of the resulting product in 480 ml. of tetrahydrofuran is cooled to 20° C. and while cooling it, 240 ml. of a 57% aqueous solution of hydriodic acid are added so that the temperature remains below 35° C. The solution turns deep red and after 10 minutes a solid substance settles out. The mixture is stirred on for 20 minutes and then 600 ml. of 20% sodium bisulphite solution are added. The colour changes to a bright yellow and a pale yellow solid substance settles out. The mixture is diluted with 5 litres of water and the solid substance is suctioned off. The pale yellow product is washed with water. The moist suction filter cake is suspended in 500 ml. of 1% potassium carbonate solution, once more suctioned off, washed with water and dried at 80° C., to yield 115 g. of $\Delta^5$-16$\alpha$-methyl-$3\beta,17\alpha$-dihydroxy-21-acetoxy-20-oxopregnene.

One crystallization from acetone yields 95 g. of a purified product melting at 179–182° C.; the pure product melts at 182–184° C.

When the corresponding pure $\alpha,\alpha$- and $\beta,\beta$-oxides are reduced in a similar manner with hydriodic acid in tetrahydrofuran, the corresponding 5-unsaturated compounds are obtained in a similarly high yield.

EXAMPLE 5

A solution of 15 g. of the 21-acetate of $3\beta,16\alpha,17\alpha$-21-tetrahydroxy-$5,6\xi$-oxido-20-oxopregnane in 45 ml. of tetrahydrofuran is stirred in a cold waterbath, while there are slowly added 30 ml. of 57% aqueous hydriodic acid. During this addition the mixture turns dark red and is then stirred on for half an hour, and the whole is then mixed with 150 ml. of 20% sodium bisulphite. The mixture is then mixed with 450 ml. of water and extracted with methylenechloride. On evaporation of the solvent under vacuum the colourless crystalline residue is recrystallized from methanol, to yield 14 g. of the 21-acetate of $\Delta^5,3\beta,16\alpha,17\alpha,21$-tetrahydroxy - 20 - oxopregnene melting at 193–195° C. $[\alpha] = -26°$.

The starting material may be prepared in the following manner: A suspension of 30 g. of $\Delta^5$-$3\beta,16\alpha,17\alpha$-trihydroxy-20-oxopregnene in 150 ml. of methylenechloride is cooled and a mixture of 22.2 g. of m-chloroperbenzoic acid in 150 ml. of methylenechloride is added. The mixture is stirred for 3 hours at 25° C. and then suctioned. The colourless solid substance is slurried for 5 minutes in 200 ml. of 1% sodium hydroxide solution and then once more suctioned. The product, (24 g.) being $3\beta,16\alpha,17\alpha$-trihydroxy-$5,6\xi$-oxido-20-oxopregnane melts at 214–216° C./reset 226–34° C.

To a solution of 36 g. of the resulting epoxide in 360 ml. of methylenechloride there are added 36 ml. of a 10% methanolic solution of hydrogen chloride and the whole is stirred for 5 minutes. A solution of 16 g. of bromine in 80 ml. of methylenechloride is then dropped in, and after the first portion has been added, hydrogen chloride gas is injected to trigger the reaction. The remainder of the bromine solution is added at the rate at which bromine is being consumed, which is evidenced by the solution losing its colour. At the end a colourless solution is obtained, to which there is slowly and cautiously added a solution of 8 g. of potassium bicarbonate in 20 ml. of water, whereupon the batch begins to froth and a precipitate forms. The batch is suctioned and the filter cake thoroughly washed with water and then dried. The product melts at 126–154° C. with decomposition; it is dissolved in 460 ml. of acetone and 92 g. of potassium acetate are added. The mixture is then refluxed for 16 hours. The acetone is almost completely evaporated under vacuum and the residual sludge is diluted with water. After suctioning, the product is washed with water and dried. The product obtained by recrystallization from methanol melts at 188–192° C.; it is the 21-acetate of 3β,16α,17α,21-tetrahydroxy-5,6ξ-oxido-20-oxopregnane.

EXAMPLE 6

6.4 ml. of 57% aqueous hydriodic acid are slowly stirred into a solution of 3.2 g. of the 16,17-acetonide of 3β,16α,17α-trihydroxy-5,6ξ-oxido - 20 - oxopregnane in 32 ml. of methylenechloride. The mixture turns dark red, and is stirred on for half an hour. Then 16 ml. of 20% sodium bisulphite are added, whereupon the solution loses its colour. The methylenechloride layer is separated and thoroughly washed with water and the solvent evaporated under vacuum to leave an oil which is recrystallized from acetone. The product so obtained (92% yield) is the 16,17-acetonide of Δ⁵-3β,16α,17α-trihydroxy-20-oxo-pregnane.

The starting material may be prepared in the following manner: To a suspension of 5 g. of Δ⁵-3β,16α,17α-trihydroxy-20-oxopregnene in 75 ml. of acetone there are added 0.5 g. of iodine and the mixture is stirred and refluxed for ½ hour. The solution obtained is then cooled. Then 20 ml. of 20% sodium thiosulphate are added, whereupon the batch loses its colour. After having added 150 ml. of water, a colourless product settles out which is suctioned off, washed with water and dried and recrystallized from acetone, to yield 5 g. of the acetonide melting at 204–209° C. It is dissolved in 50 ml. of methylenechloride and 4.5 g. of m-chloroperbenzoic acid in 50 ml. of methylenechloride are added at 0° C., and the mixture is then stirred for two hours at room temperature (25° C.). The batch is filtered and the methylenechloride layer washed with 2% potassium bicarbonate solution until a pH value of 8 is reached, and then thoroughly washed with water up to a pH value of 7. The methylenechloride is expelled under vacuum and the resulting solid residue recrystallized from acetone. The resulting 16,17-acetonide of 3β,16α,17α - trihydroxy-5-6ξ-oxido - 20 - oxopregnane melts at 201–203° C.

EXAMPLE 7

30 grams of the 21-acetate of 3β,17α,21-trihydroxy-5α,6α-oxido-16α-methyl-20-oxopregnane is dissolved in 150 ml. of tetrahydrofuran. While stirring 52 ml. of 57% aqueous hydriodic acid are added whereupon the solution turns brown and the temperature rises to about 50° C. The mixture is stirred on for 30 minutes and then 145 ml. of 20% sodium bisulphite solution are slowly added. The iodine colour disappears and the product precipitates. The whole is filtered and the residue washed with water. The colourless product is dried to yield 26.0 grams of crude 21-acetate of Δ⁵-3β,17α,21 - trihydroxy-16α-methyl-20-oxopregnene. The pure compound obtained by recrystallization from ethanol melts at 174–176° C.

What is claimed is:

1. A process for the manufacture of 21-acyloxy-3β,17α-dihydroxy-5-pregnen-20-ones of the general formula

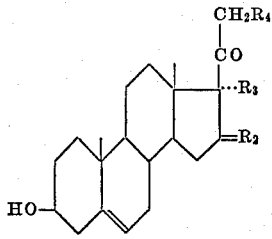

in which $R_2$ represents a member selected from the group consisting of two hydrogen atoms, an alkylene group, and one hydrogen atom together with a member selected from the group consisting of an α- and β-alkyl group, a free esterified and etherified α-hydroxyl group, $R_3$ represents hydroxyl, $R_4$ stands for an esterified hydroxyl group and $R_2+R_3$ represents the residue

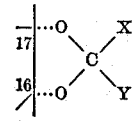

in which X and Y represent each a member selected from the group consisting of an unsubstituted hydrocarbon residue and a hydrocarbon residue substituted by a member selected from the group consisting of hydroxyl groups, acyl groups, free and esterified carboxyl groups, which comprises:

(a) oxidizing a steroid of the general formula

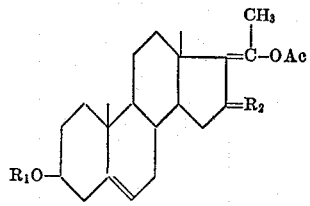

in which Ac and $R_1$ represent each an acyl residue and has the meaning given above with a peracid;

(b) treating the resulting 5,6;17,20-bis-oxido-compound with an alkaline reagent;

(c) treating the resulting 5,6-oxido-17α-hydroxy-20-ketone with a reagent selected from a group consisting of hydrochloric and hydrobromic acid, and subsequently with bromine;

(d) reacting the resulting 21-bromide with a salt of an organic acid, and (e) reducing the resulting 5,6-oxido-17α-hydroxy-21-acyloxy-20-ketone with at least two molar equivalents of hydriodic acid.

2. A process according to claim 1, wherein prior to the treatment with hydriodic acid, a resulting 5,6-oxido-17α-hydroxy-21-acyloxy-20-ketone which contains an additional 16α-hydroxyl group is converted to the corresponding compound containing the residue

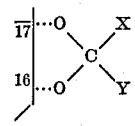

specified above.

3. A process according to claim 1, wherein a 5α,6α-oxidosteroid or a mixture of a 5α,6α- and a 5β,6β-oxidosteroid is treated with hydriodic acid.

4. A process according to claim 1, wherein about 6 to 8 mol equivalents of hydriodic acid are used.

5. A process according to claim 1, wherein the hydriodic acid is used in form of an aqueous solution of about 55% strength.

6. A process according to claim 1, wherein the reduction is carried out under mild conditions.

7. A process according to claim 1, wherein the reduction is carried out at room temperature.

8. A process according to claim 1, wherein subsequent to the treatment with hydriodic acid a reducing agent is added that is capable of reducing iodine to hydriodic acid or a salt thereof.

9. A process according to claim 8, wherein subsequent to the treatment with hydriodic acid sodium bisulphite is added.

10. A process according to claim 9, wherein the sodium bisulphite is used in form of an aqueous solution of about 20% strength.

11. A process according to claim 4, wherein in the final step, the 5,6-oxido compound is treated for about half an hour at room temperature with an aqueous hydriodic acid solution of about 55% strength, then sodium bisulphite is added and the batch is allowed to react for about half an hour at room temperature.

12. A process according to claim 1, wherein in the final step, the 5,6-oxidosteroid is dissolved in a hydrocarbon.

13. A process according to claim 12, wherein a chlorinated hydrocarbon is used.

14. A process according to claim 12, characterized by the use of methylenechloride.

15. A process according to claim 1, wherein an ether is used as solvent for the 5,6-oxidosteroid in the final step.

16. A process according to claim 1, wherein tetrahydrofuran is used as solvent.

17. A process according to claim 1, wherein a mixture of the 5α,6α-oxidosteroids and 5β,6β-oxidosteroids is used in the final step of the reaction sequence.

18. A process according to claim 1, in which starting materials $R_1$ and Ac represent an acyl residue derived from a lower aliphatic carboxylic acid.

19. A process according to claim 1, in which starting materials an α- or β-alkyl group is methyl.

20. A process according to claim 1, wherein in Step (a), the starting material is treated with a reagent selected from the group consisting of perbenzoic, chloroperbenzoic, peracetic and perphthalic acid.

21. A process according to claim 20, wherein the starting material is treated with meta-chloroperbenzoic acid.

22. A process according to claim 1, wherein in Step (b), an intermediate 5,6;17,20-bis-oxido compound is treated with sodium hydroxide.

23. A process according to claim 1, wherein in Step (c), the intermediate 5,6-oxido-17α-hydroxy-20-ketone is treated with hydrogen bromide.

24. A process according to claim 23, wherein the hydrogen bromide is used as a solution in glacial acetic acid.

25. A process according to claim 1, wherein in Step (c), the intermediate 5,6-oxido-17α-hydroxy-20-ketone is treated with hydrogen chloride.

26. A process according to claim 1, wherein in Step (c), the treatment with bromine is carried out in the presence of hydrogen chloride.

27. A process according to claim 1, wherein in Step (d), the intermediate 21-bromide is treated with a salt of a lower aliphatic carboxylic acid.

28. A process according to claim 27, wherein an alkaline metal salt of a lower aliphatic carboxylic acid is used.

29. A process according to claim 28, wherein potassium acetate is used.

30. A process according to claim 27, wherein the reaction is carried out in acetone.

31. A process according to claim 1, wherein the 21-acetate of 3β,17α,21-trihydroxy-5,6-oxido pregnan-20-one is used as starting material in Step (e).

32. A process according to claim 1, wherein the 21-acetate of 3β,17α,21-trihydroxy - 16α - methyl-5,6-oxido pregnan-20-one is used as starting material in Step (e).

33. A process according to claim 1, wherein the 21-acetate of 3β,16α,17α,21-tetrahydroxy-5,6-oxido pregnan-20-one is used as starting material in Step (e).

34. A process according to claim 2, wherein the 21-acetate of 3β,16α,17a,21-tetrahydroxy-5,6-oxido pregnan-20-one-16,17-acetonide is used as starting material in Step (e).

References Cited

Morita: Nippon Kagaku Zasski, 78, p. 1705 (1957).

ELBERT L. ROBERTS, Primary Examiner

U.S. Cl. X.R.

260—397.4, 397.45, 397.47

PO-1050
(5/69)

UNITED STATES PATENT OFFICE
CERTIFICATE OF CORRECTION

Patent No. 3,759,899      Dated September 18, 1973

Inventor(s) Percy L. Julian et al

It is certified that error appears in the above-identified patent and that said Letters Patent are hereby corrected as shown below:

Column 10, line 25, after "residue and" insert --- $R_2$ ---.

Column 11, line 11, delete "1" and substitute --- 15 ---.

Signed and sealed this 9th day of April 1974.

(SEAL)
Attest:

EDWARD M. FLETCHER, JR.
Attesting Officer

C. MARSHALL DANN
Commissioner of Patents aaa